(12) United States Patent
Lawson et al.

(10) Patent No.: US 6,381,306 B1
(45) Date of Patent: Apr. 30, 2002

(54) SYSTEM AND METHOD FOR MONITORING SERVICE QUALITY IN A COMMUNICATIONS NETWORK

(75) Inventors: Gerald Ray Lawson, Sachse; Chad Daniel Harper, Plano; Grant Michael Brehm, McKinney; Gaurang S. Kalyanpur, Allen, all of TX (US)

(73) Assignee: Inet Technologies, Inc., Richardson, TX (US)

( * ) Notice: Subject to any disclaimer, the term of this patent is extended or adjusted under 35 U.S.C. 154(b) by 0 days.

(21) Appl. No.: 09/093,955

(22) Filed: Jun. 8, 1998

(51) Int. Cl.[7] .......................... H04M 1/24; H04M 15/00
(52) U.S. Cl. ............................... 379/32.01; 379/32.02; 379/112.01; 379/112.06; 379/133; 379/134; 379/32.03
(58) Field of Search ................................ 379/34, 9, 10, 379/15, 112, 113, 133, 134, 32.01, 32.02, 32.03, 32.05, 111, 112.01, 112.06, 112.07, 112.08, 114.01, 121.01, 114.28, 115.01

(56) References Cited

U.S. PATENT DOCUMENTS

| 5,008,929 A | 4/1991 | Olsen et al. ................. 379/112 |
| 5,333,183 A | 7/1994 | Herbert ....................... 379/112 |

(List continued on next page.)

FOREIGN PATENT DOCUMENTS

| EP | 0541145 A1 | 10/1992 | ............ H04M/3/36 |
| WO | WO 97/057469 A3 | 2/1970 | ............ H04M/15/00 |
| WO | WO 95/33352 | 12/1995 | ............ H04Q/7/34 |
| WO | WO 97/05749 A2 | 2/1997 | |
| WO | WO98/47275 | 10/1998 | ............ H04M/7/00 |

OTHER PUBLICATIONS

George Pavlou et al., Intelligent Remote Monitoring, Oct. 16, 1995.

Primary Examiner—Stella Woo
Assistant Examiner—Quoc D. Tran
(74) Attorney, Agent, or Firm—Fulbright & Jaworski L.L.P.

(57) ABSTRACT

A system and method for generating service quality statistics for a communications network is disclosed. Network monitors capture messages in a communications network, such as an SS7 network, and correlate related messages into records. The records are filtered using a call detail record profile to create call detail records which are provided to an statistics server. The statistics server generates certain statistics for the message records and stores the statistics to a database. A report application recalls the statistics from the database and presents statistics in a reporting format configured by the user. The reports indicate the statistical performance of network providers for selected called or calling telephone numbers or for selected services.

10 Claims, 2 Drawing Sheets

U.S. PATENT DOCUMENTS

| | | | |
|---|---|---|---|
| 5,426,688 A | | 6/1995 | Anand .......................... 379/5 |
| 5,438,570 A | * | 8/1995 | Karras et al. ................ 379/133 |
| 5,448,624 A | * | 9/1995 | Hardy et al. ................... 379/67 |
| 5,457,729 A | * | 10/1995 | Hamann et al. ............... 379/2 |
| 5,473,596 A | | 12/1995 | Garafola et al. ............. 370/13 |
| 5,475,732 A | | 12/1995 | Pester, III ..................... 379/34 |
| 5,488,648 A | * | 1/1996 | Womble ........................ 379/1 |
| 5,521,902 A | | 5/1996 | Ferguson ..................... 370/13 |
| 5,539,804 A | | 7/1996 | Hong et al. ................... 379/33 |
| 5,550,914 A | | 8/1996 | Clarke et al. ............... 379/230 |
| 5,550,984 A | | 8/1996 | Gelb ...................... 395/200.17 |
| 5,579,371 A | | 11/1996 | Aridas et al. ................. 379/34 |
| 5,590,171 A | * | 12/1996 | Howe et al. ................... 379/88 |
| 5,592,530 A | * | 1/1997 | Brockman et al. ............ 379/34 |
| 5,675,635 A | | 10/1997 | Vos et al. |
| 5,680,437 A | | 10/1997 | Segal ........................... 379/10 |
| 5,680,442 A | | 10/1997 | Bartholomew et al. ....... 379/67 |
| 5,694,451 A | * | 12/1997 | Arinell ........................ 379/34 |
| 5,699,348 A | | 12/1997 | Baidon et al. .............. 370/242 |
| 5,699,412 A | * | 12/1997 | Polycn ......................... 379/89 |
| 5,703,939 A | | 12/1997 | Bushnell ..................... 379/113 |
| 5,706,286 A | | 1/1998 | Reiman et al. ............. 370/401 |
| 5,712,908 A | * | 1/1998 | Brinkman et al. ........... 379/119 |
| 5,729,597 A | | 3/1998 | Bhusri ........................ 379/115 |
| 5,737,332 A | | 4/1998 | Corrigan et al. |
| 5,737,399 A | | 4/1998 | Witzman et al. ............. 379/112 |
| 5,757,875 A | * | 5/1998 | Aridas et al. ................ 379/136 |
| 5,793,771 A | | 8/1998 | Darland et al. ............. 370/467 |
| 5,799,073 A | | 8/1998 | Fleischer, III et al. ...... 379/113 |
| 5,822,401 A | * | 10/1998 | Cave et al. ................... 379/34 |
| 5,825,769 A | | 10/1998 | O'Reilly et al. ............. 370/360 |
| 5,828,729 A | | 10/1998 | Clermont et al. ............. 379/34 |
| 5,854,824 A | * | 12/1998 | Bengal et al. ................. 379/34 |
| 5,854,835 A | * | 12/1998 | Montgomery et al. ...... 379/119 |
| 5,867,558 A | | 2/1999 | Swanson ..................... 379/34 |
| 5,875,238 A | | 2/1999 | Glitho et al. ............... 375/116 |
| 5,881,132 A | | 3/1999 | O'Brien et al. ............... 379/35 |
| 5,883,948 A | | 3/1999 | Funn .......................... 379/210 |
| 5,892,812 A | | 4/1999 | Pester ......................... 379/34 |
| 5,912,954 A | | 6/1999 | Whited et al. ............... 379/115 |
| 5,920,613 A | | 7/1999 | Alcott et al. ................ 379/114 |
| 5,999,604 A | * | 12/1999 | Walter ....................... 379/133 |
| 6,028,914 A | | 2/2000 | Lin et al. ...................... 379/14 |
| 6,282,267 B1 | | 8/2001 | Nolting |

* cited by examiner

SYSTEM AND METHOD FOR MONITORING SERVICE QUALITY IN A COMMUNICATIONS NETWORK

RELATED APPLICATIONS

The present invention is related to pending applications assigned Ser. No. 09/057,940, entitled SYSTEM AND METHOD FOR MONITORING PERFORMANCE STATISTICS IN A COMMUNICATIONS NETWORK, filed Apr. 9, 1998; Ser. No. 09/092,428, entitled SYSTEM AND METHOD FOR DETECTING HIGH MESSAGE TRAFFIC LEVELS IN A COMMUNICATIONS NETWORK; Ser. No. 09/092,699, entitled SYSTEM AND METHOD FOR SIGNAL UNIT DATA STORAGE AND POST CAPTURE CALL TRACE IN A COMMUNICATIONS NETWORK; Ser. No. 09/092,256, entitled SYSTEM AND METHOD FOR GENERATING QUALITY OF SERVICE STATISTICS FOR AN INTERNATIONAL COMMUNICATIONS NETWORK; and Ser. No 09/092,771, entitled SYSTEM AND METHOD FOR CORRELATING TRANSACTION MESSAGES IN A COMMUNICATIONS NETWORK, all filed Jun. 5, 1998; and Ser. No. 09/093,824, entitled TRANSACTION CONTROL APPLICATION PART (TCAP) CALL DETAIL RECORD GENERATION IN A COMMUNICATIONS NETWORK, filed concurrently herewith. These applications are commonly assigned and are hereby incorporated by reference herein.

TECHNICAL FIELD OF THE INVENTION

The present invention is related to monitoring signals in a communications network and, more particularly, to measuring service provider service quality on a communications network.

BACKGROUND OF THE INVENTION

Common channel signaling networks, such as the Signaling System Seven (SS7) based signal system, use dedicated channels to pass digital messages between systems for call setup, call control, call routing, and other functions. These dedicated signaling channels are part of a network that is separate from the network that carries the actual voice and data signals. An SS7 network is a separate switching system which is used prior to, during, and at the end of an actual voice or data call. The SS7 network is used to route control information. Whenever two switches or elements have to pass call control information during or prior to a phone call, they pass this data via the SS7 signaling network.

There are three basic types of network node elements in an SS7 network. One of them is the Service Switching Point (SSP), which may be a central office switch, a tandem switch or an end office switch. A second principal node element is the Service Control Point (SCP). An SCP acts as a database query server for the rest of the network. An SCP is used in such applications as translating ported telephone numbers, routing 800 calls, tracking roamers in a cellular network, and Alternate Billing Service/Line Identification Database services (or ABS/LIDB) which provide operator-type services. The third principal node element is the Signal Transfer point (STP). An STP is essentially a packet switch that routes the messages from SSPs and SCPs to SSPs and SCPs.

It is possible to combine these three different types of nodes into a single node. However, in North America, they are typically not combined. An SSP performs only switch functions, an SCP only control functions, and an STP only signal transfer functions. In European telecommunications systems, all of these different functions may be combined into one node.

The SS7 network carries a great deal of information and is extremely critical to the operation of the phone system. If an SS7 network is not functioning, or if portions of it are not operating, the phone system simply cannot deliver phone calls, even though all of the voice circuits are operating properly. The capacity and complexity of the SS7 network is small in terms of circuitry and bandwidth utilized by an end user compared to previous voice and data networks. The circuitry of the SS7 network is therefore much more critical. The actual elements in the SS7 network do not provide all the information required in network operations to manage and to determine the health and state of an SS7 network. It is therefore necessary for the telephone industry to deploy surveillance equipment to monitor the links connecting the nodes of the SS7 network.

The topology of the network is such that STPs are typically deployed in a mated pair configuration at geographically separate locations. Connected to a mated pair of STPs will be a set of SSPs and SCPs. This conglomeration of SSPs, SCPs and mated Pair STPs is called a cluster. Clusters are then connected by D-Quad links between STP mated pairs. The mated pair configuration system is not required and it is not used in all communications systems capable of employing the present invention.

When any call, transaction or message is sent between two different devices on the network, it is often the case that the messages going from switch A to switch B travel one route on the network while the messages going from switch B to switch A travel a different route. The network surveillance equipment that monitors the link is designed to capture and correlate as much signaling information as possible regardless of network activity. Because of the different data paths that messages may take, it is difficult to do this correlation above what is called the transport layer when monitoring links at the STP sites. An example of an application level problem would be where a subscriber has a problem getting his/her calls delivered. The telephone company may attempt to fix the problem by doing a trace of all data pertaining to that subscriber's phone number, but the data may not all be located at one point. The data may be all in one STP, or split in some fashion, partially in one STP and partially in the other STP of a mated pair, which may be in a different city many miles away.

SUMMARY OF THE INVENTION

These and other objects, features and technical advantages are achieved by a system and method in which a monitoring network, having network monitors that capture messages, such as message signal units (MSUs), from links in a communications network, correlates the messages into call or transaction records for further processing. The monitors have a plurality of processors for processing the captured messages. The processors may run any of a number of message or record processing applications. In the present invention, a quality assurance application provides an integrated platform for message tracking on a per customer and/or a per service provider basis. The tracked messages may be part of one of a number of message protocols, such as Integrated Services Digital Network—User Part (ISUP), Telephone User Part (TUP), Network User Part (TUP), Transaction Capabilities Application Part (TCAP), Advanced Intelligent Network (AIN) or Integrated Network Application Part (INAP) calls or transactions. The quality assurance application is ideal for larger networks or for evaluating service quality of application-layer services, such as INAP, Global System for Mobile Communications (GSM), AIN, IS-41 and 800LIDB/CLASS.

In a preferred embodiment, the quality assurance application runs on a server that is external to the network monitoring system. The monitoring system provides data to the external server in the form of Call Detail Records (CDRs). The quality assurance application tracks the quality of service that is provided to customers on a particular communications network. The present invention allows customers, service providers and others to monitor how a service is performing not only within the network infrastructure, but also how well that service is working on a call-by-call, customer-by-customer basis. Additionally, the present invention allows service providers to efficiently manage network services without requiring an increased support staff.

The quality assurance application runs on an independent server and processes CDRs that are received from the monitoring system. In a preferred embodiment, individual monitoring units exchange and correlate messages into call or transaction records. The monitoring unit then filters the records using a CDR profile to determine which records, and which messages, should be combined to form the CDR. The monitoring units then transmit the CDRs directly to the external server. In an alternative embodiment, some other entity in the monitoring system, such as a central server, may generate and forward CDRs to the independent quality assurance application.

The quality assurance application provides service quality analysis tools and reports. The application generates historical statistic reporting for circuit-based services or for application-layer services. The statistics are maintained in a database which can be accessed to generate quality of service reports. When used to monitor service on an SS7 network, the present invention maintains statistics for all ISUP/TUP circuit-based calls. Statistics are maintained by called number, calling number and translated number. Users may generate reports for the statistical information by accessing the database through a workstation. The reports may be customized using various indices, such as by called, calling, or translated number.

Additional statistics may be monitored and other reports may be created for other communications networks or protocols. For example, TCAP statistics may be monitored and reports may be generated by service as well as by called, calling and translated number. Statistics for other application layer services could also be monitored. Such as for INAP, GSM, AIN, IS-41 and 800/LIDB/CLASS services.

Communications network monitoring equipment which may be used in conjunction with the present invention is disclosed in U.S. Pat. No. 5,592,530, entitled TELEPHONE SWITCH DUAL MONITORS; and in pending patent applications assigned Ser. No. 09/057,940, entitled SYSTEM AND METHOD FOR MONITORING PERFORMANCE STATISTICS IN A COMMUNICATIONS NETWORK; Ser. No. 09/092,428 entitled SYSTEM AND METHOD FOR DETECTING HIGH MESSAGE TRAFFIC LEVELS IN A COMMUNICATIONS NETWORK; Ser. No. 09/092,699 entitled SYSTEM AND METHOD FOR SIGNAL UNIT DATA STORAGE AND POST CAPTURE CALL TRACE IN A COMMUNICATIONS NETWORK; Ser. No. 09/092,256 entitled SYSTEM AND METHOD FOR GENERATING QUALITY OF SERVICE STATISTICS FOR AN INTERNATIONAL COMMUNICATIONS NETWORK; and Ser. No. 09/092,771 entitled SYSTEM AND METHOD FOR CORRELATING TRANSACTION MESSAGES IN A COMMUNICATIONS NETWORK, filed Jun. 5, 1998 the disclosures of which are hereby incorporated by reference herein. These references and the present application are commonly assigned.

It is a feature of the present invention to track performance statistics in a communications network. The invention provides statistical reports which show how many calls were successfully connected to the called number and how many calls were dropped. The reports allow users to determine the reason for call failures and to identify portions of the network which are not operating properly.

It is another feature of the present invention to allow customers, service providers and third parties with the ability to monitor a the quality of service on a particular communications network. Customers can use the statistical reports to determine their service provider's quality of service. The present system can also be used by customers to determine if the customers' systems are providing adequate service. For example, call centers can use the statistical data to determine whether additional agents are needed to answer calls that have been dropped due to busy lines. Service providers may use the information to monitor the service provided by their network and to identify failure points on the network. Service providers can also monitor the quality of service provided by other service providers on other networks.

It is an additional feature of the invention to generate statistical reports for called, calling or translated numbers or for services. Additionally, users can designate particular link sets to be used for the statistical report generation. As a result, only those monitors capturing messages from the designated link sets will send CDRs to the quality of service application.

It is another feature of the present invention to provide statistical reports in real-time on a network-wide basis for both calls and transactions. Historical data is also stored to a database for later recall by the user.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
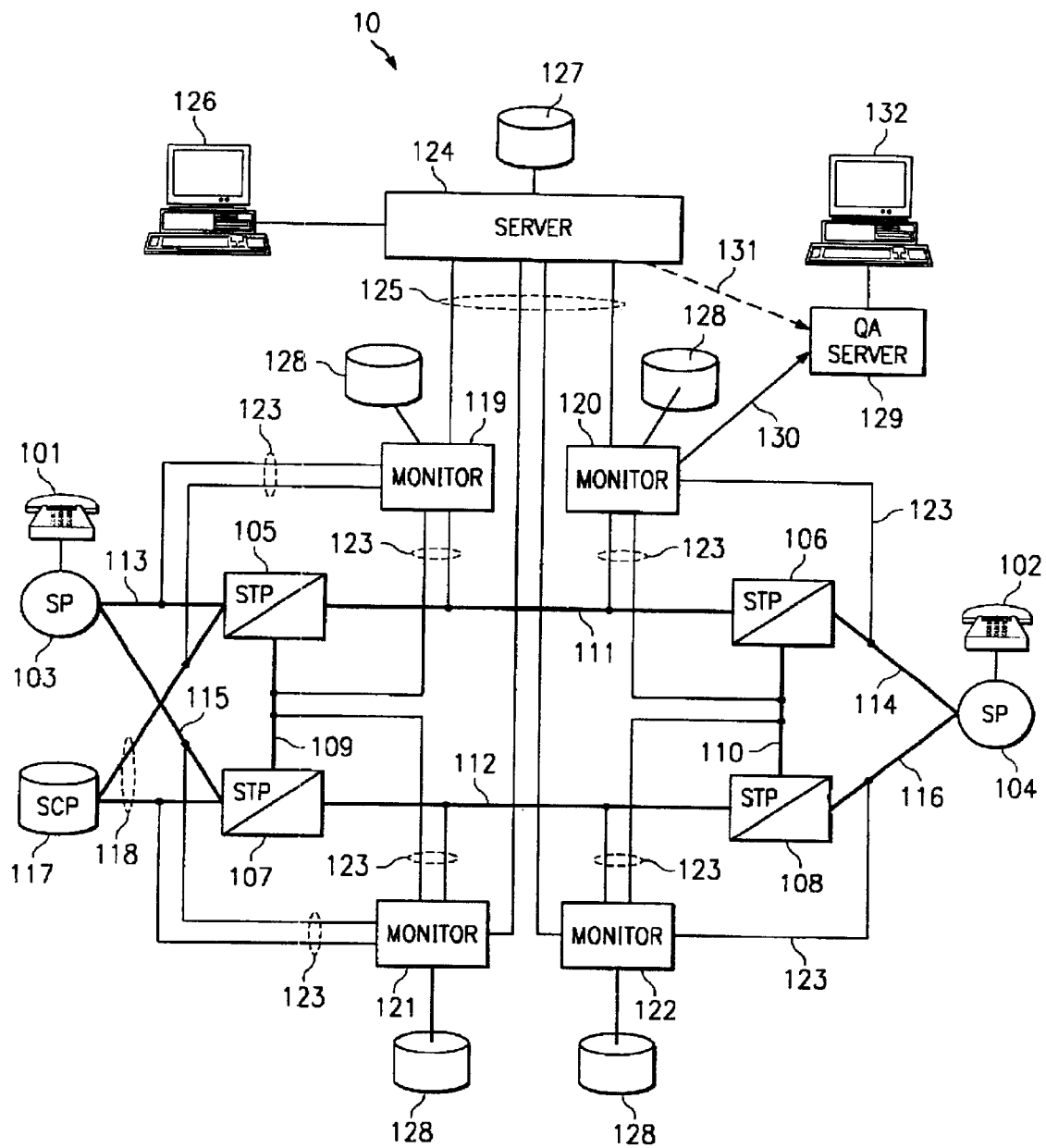
FIG. 1 is a block diagram of a communications network and monitoring system incorporating the present invention.

FIG. 1 is a block diagram of communications network 10 in which telephones 101 and 102 communicate via a signaling network, such as an SS7 network. It will be understood that telephones 101, 102 are used for illustration purposes only and that any voice or data communications device may be connected to the network. In the embodiment illustrated in FIG. 1, telephones 101 and 102 are connected to end offices 103 and 104, which may be Signaling Points (SP), as shown, or SSPs. End offices 103 and 104 are linked to each other through a signaling network comprised of STPs 105–108, which are connected via links 109–112. SPs 103 and 104 are connected to STPs 105–108 via links 113–116. Calls, transactions and other signals or messages between end office 103 and end office 104 may take any of a number of paths across links 109–116 and through STPs 105–108.

Typically, a series of signals that are related to one call or transaction will traverse across the same path through network 10 from one end office to another. For example, for a particular transaction, all signaling units sent from SP 103 may cross links 113, 111, and 114 through STPs 105 and 106. However, network problems or system failures may cause different signals for the same transaction to take different paths. It is also typical that signals traversing the system in the reverse direction may use a different path through the network. For example, for the same transaction illustrated above, signals from SP 104 may traverse links 116, 112, and 115 through STPs 108 and 107. Therefore, a single link or network element may not see all the messages or signals for one complete transaction or call.

In certain circumstances, such as for an 800 number call or for a call to an exchange or number that has been ported to a different switch, message may be sent to SCP 117 to perform various database look-up functions. Signals or messages are exchanged with SCP 117 via links 118. In other embodiments, there may be additional components in network 10, such as Service Nodes (SN) or Intelligent Peripherals (IP), which would require additional signal paths.

In network 10, monitors 119–122 are individually paired with STPs 105–108. Each monitor 119–122 is coupled to every link for a particular STP by connections 123, which may be embodied as a branch or tee off of links 109–116. This allows monitors 119–122 to capture or detect every signaling unit that is sent to, or from, each STP 105–108. As described in U.S. Pat. No. 5,592,530 and application Ser. No. 09/057,940, monitors 119–122 are coupled via an inter-monitor communications link (not shown) which allows monitors 119–122 to transfer captured signaling units and messages among themselves. Typically, the first monitor to detect a signaling unit for a call or transaction is designated as a controlling or anchor monitor. The other monitors then send any later detected signaling units for the same transaction or call to the anchor monitor. The anchor monitors correlates all of the messages from a particular transaction or call into a single record. Usually, each signaling unit is identified as belonging to a particular transaction by the Transaction Identifier (TID).

Monitors 119–122 are connected to server 124 via connection 125, which may be a Wide Area Network (WAN) or any other data network connection. Once a call or transaction record is complete, the record is then sent to server 124 for further processing. Monitors may determine that a record is complete when an end message is detected for that particular call or transaction. Workstation 126 is connected to server 124 and may be directly connected to monitor 105–108. Workstation 126 provides network service providers or other users with access to retrieve data or to configure server 124 or monitors 119–122.

Server 124 is coupled to data storage device 127 and monitors 119–120 are coupled to data storage device 128. Memory units 127 and 128 may be used to store configuration and profile data for use by the monitoring system. Monitors 119–122 may use a local memory, such as 128, to store call or transaction records, or other message data. Alternatively, records and messages may be routed to server 124 for storage on a central database, such as data storage device 127.

In the present invention, monitors 119–122 filter the correlated messages and the call and transaction records to generate a CDR data stream that is sent to independent server 129 via link 130. Although it is not shown in FIG. 1, in the preferred embodiment, each monitor 119–122 is linked to server 129 by a connection, such as 130, which allows CDR data to be sent directly to server 129. Alternatively, server 124 may collect all of the CDR data, or server 124 may perform the record screening function itself, and forward the CDR information to server 129 via link 131. Users can access server 129 from workstation 132 to select and configure statistical reports.

Server 129 runs the quality assurance application, which integrates ISUP, TUP, NUP, TCAP, AIN, GSM, IS-41 and INAP transaction and call tracking on a per customer or per service provider basis. The quality assurance application performs statistics accumulation at the user part level and at the application level. Collected statistics are stored in a database, and reports from the statistics are available to users via workstation 132. The statistics are collected from the CDR data streams that are provided by monitors 119–122. The creation of CDR data streams is described in detail in application Ser. No. 09/093,824, entitled TRANSACTION CONTROL APPLICATION PART (TCAP) CALL DETAIL RECORD GENERATION IN A COMMUNICATIONS NETWORK, filed concurrently herewith, the disclosure of which is hereby incorporated by reference herein.

TABLE 1 is a list of the parameters that can be used to create CDR profiles.

TABLE 1

Call State that Triggers the CDR Generation
    Address Complete
    Answer
    Call Termination
Application Type
    ANSI ISUP
    ITU ISUP
    ITU TUP
    ITU NUP
    IS-41
    CLASS
    LIDB
    AIN
    INAP
    National Variants
    Toll Free/800
Point Codes
    OPC
    DPC
Calling Party Numbers
Called Party Numbers
Translated Numbers
Dialed Digits
Destination Digits
Mobile Identification Number (MIN)
Routing Numbers
Account Numbers
Electronic Serial Number
Location Routing Number TABLE 2 lists the fields of a preferred CDR format and the definitions of the field contents.

TABLE 2

| | |
|---|---|
| Length of Entire CDR | |
| Length of Fixed Fields | Indicates the length of the fixed CDR fields. The value is the number of bytes after the "Length of Fixed" field to the "User Field Length" field. |
| CDR Sequence Number | Numeric value that uniquely identifies the call record within the monitoring system. Uniqueness is guaranteed system wide. The system also uses this number to indicate the delivery monitor and its process ID. |
| CDR Condition Indicator | Indicates various conditions within a call/transaction. |
| Date/Time of Transaction Start | GMT time when a transaction begins. |
| Date/Time of Transaction End | GMT time, when a transaction end message is encountered. |
| CIC | Carrier Identification Code |
| OPC | Network indicator, protocol as well the origination pointcode of the call. |
| DPC | Network indicator, protocol as well the destination pointcode of the call. |
| Abort Reason | Abort cause of the transaction. |
| Application | SSN of the concerned application. |
| Number of Calling Party Digits | The number of digits in the calling party number. |
| Calling Party Number | The phone number identified as the calling phone number. |
| Number of Called Party Digits | The number of digits in the called party number. |
| Called Party Number | The phone number identified as the called phone number. |

TABLE 3 lists the user defined fields of a preferred CDR format and the definitions of the field contents.

TABLE 3

| | |
|---|---|
| User Fields Length | Indicates the length of the user-defined CDR fields section. The value is the number of bytes after this field to the end of the user defined fields. |
| MSU Filds Length | Indicates the total length of the MSU section. The value is the number of bytes after this field to the end of the CDR. |
| Number of MSUs | Indicate the total number of the MSUs in this CDR. |
| Time Stamp | GMT time, when this transaction was encountered. |
| Link Number | Indicates the link identifier on which the MSU was encountered. |
| MSU Length | Indicates the total length of the MSU following. |
| MSU | Actual MSU that was captured by the monitoring system. |

Table 4 lists the fields for a CDR format with Integrated Services Digital Network-User Part (ISUP) parameters.

TABLE 4

RIN Parameter
UUI Octets
USR Messages
UUI Indicator
Calling Party Nature of Address
Redirecting Number Nature of Address
Original Called Number Nature of Address
Location Number Nature of Address
Redirection Information
TMR Value
Calling Party's Category
Number of Redirecting Number Digits
Redirecting Number
Number of Original Called Digits
Original Called Number
Number of Location Number Digits

TABLE 4-continued

Location Number
User Definable Parameters

Figure 2:
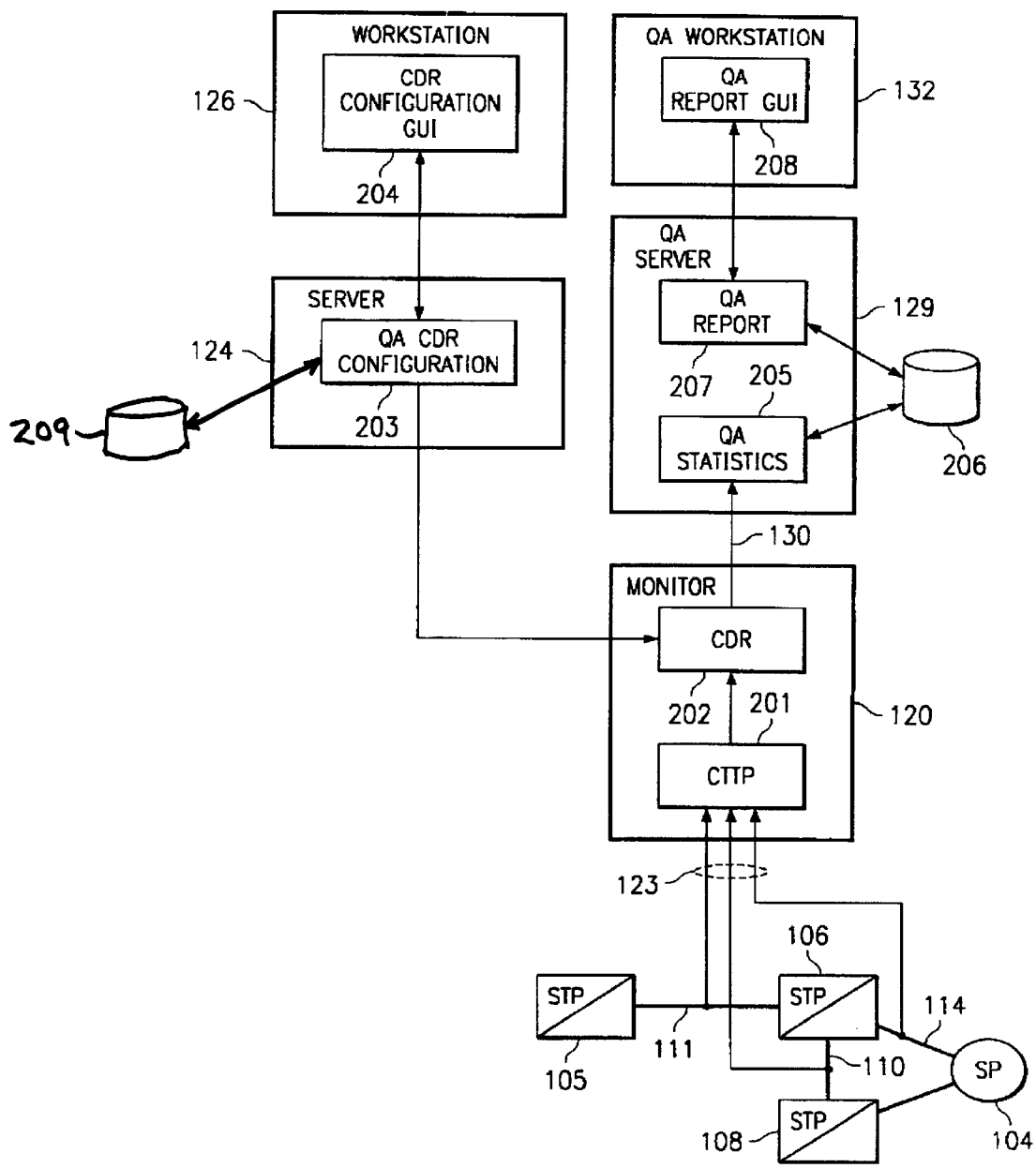
FIG. 2 is a block diagram illustrating the applications used in a preferred embodiment of the present invention.

FIG. 2 illustrates system 20 having CDR applications running on the components of a monitoring network and having quality assurance applications running on QA server 129 and workstation 132. Components of FIG. 2 are numbered to correspond with like components of FIG. 1. Monitor 120 is capable of monitoring several hundred SS7 links at one time. Monitor links 123 capture messages from network links, such as 111, 110 and 114, in the SS7 network. The messages are provided to a call/transaction processing application, such as Call/Transaction Tracking Processor (CTTP) 201. Monitor 120 comprises a number of versatile processors which may be assigned to process and correlate calls, transactions, or other messages. One or more of these processors run CTTP application 201 depending upon the volume of message traffic received from the SS7 network. As discussed above, monitor 120 communicates with other monitors, such as 119, 121 and 122, and exchanges messages pertaining to the calls and transactions that are being monitored.

Monitor 120 also comprises CDR application 202, which runs on another processor. CDR application 202 receives correlated message records from CTTP application 201 and filters the records using a CDR profile. Ideally, CDR application 202 receives complete records for each call and transaction from CTTP application 201. However, depending upon the state of a particular call or transaction, partial records may be provided. CDR application 202 collects messages for call legs and generates a Call Detail Record. The CDR contains summary information of the statistics for each call. Application 202 generates a binary CDR that is sent to QA server 129 via Transmission Control Protocol/Internet Protocol (TCP/IP) for further processing. There may be one or more QA servers coupled to the monitoring network or to individual monitors. Monitor 120 sends the CDR data to the QA server listed in a QA CDR profile.

Typically, the CDRs are not stored on monitor 120. The binary CDR data is streamed to QA server 129 as soon as it is created. A unique identifier is created for each CDR so that QA server can distinguish among the CDRs that are received from various monitors. Messages that are received out of sequence by CTTP application 201 are sent to CDR application 202, which attaches the out of sequence message to the CDR data stream.

Monitoring system server 124 is responsible for tracking all CDR configurations that have been set up by users. QA CDR configuration application 203 cooperates with CDR application 204 on workstation 126 to provide a user interface to configure the QA CDR profiles. Server 124 stores the QA CDR profiles as files in memory 209. The profiles are downloaded to monitors 119–122 as necessary so that the monitors will have the proper configuration to process the correlated message records.

Users configure the QA CDR profiles, and other monitoring system parameters, using workstation 126. CDR configuration application 204, which may be a Graphical User Interface (GUI), allows users to configure CDR profiles for storage on server 124. Information provided by users on workstation 126 is stored as a configuration file in database 209. Sever 124 downloads the configuration file data to specific monitors 119–122 over Simple Network Management Protocol (SNMP). Users may modify the CDR profile configurations. Changes to old configurations are relayed to the appropriate monitors 119–122.

QA server 129 is preferably a dedicated server for the quality assurance application because of the high volume of data associated with the call and transaction records. CDR data streams from monitors, such as data on link 130 from monitor 120, is processed by QA statistics application 205. Database 206 holds the CDR data for QA server 129. QA statistics application 205 collects CDRs from monitors 119–122 and stores the data to database 205. This data is then later recalled by QA report application 206, which reports statistics on the data when requested by users. QA workstation 132 provides the user interface to QA report application 207 through QA report GUI 208. Users configure the desired parameters for the statistical reports via QA report GUI 208. QA report application 207 then recalls and formats the stored data from database 206.

Depending upon the user's system, databases 206 and 209 may be an integral part of servers 124 and 129, or the databases 206, 209, may be embodied as separate storage devices.

The amount of data stored and the message traffic volume are the key determinants of the size and processing power of QA server 129. Processing capabilities can be adjusted on a per user basis. The minimum configuration of the preferred embodiment is a server having 150 GB storage and 1 GB memory. A redundant server having equivalent capacity may also be used. Workstation 132 provides users with a GUI interface to configure statistic reports.

QA server 129 collects CDRs from monitors 119–122 and extracts statistical information to be stored in database 206. CDRs for calls in an SS7 network are available upon call completion. QA statistics application 205 accumulates the messages statistics completion of the call or transaction and adds the statistics to database 206 at intervals based upon the origination time of the call or transaction. The statistics are continually collected and stored to database 206, but they are reported only upon user request.

The format used to store the statistics data in database 206 is highly configurable and may be adapted for any storage configuration that the user may desire. For example, in one embodiment, separate data entries are made for each hour in a daily table in database 20. Thus, if server 129 and database 206 are configured to hold a week's worth of statistical data, then seven daily tables, each having 24 intervals, are stored on database 206. Each daily table is stored for seven days. Daily tables are summarized into weekly tables at the end of seven days. Weekly tables have seven intervals, each interval representing a summarized daily table. Weekly tables are stored for 90 days, at which point they are summarized into monthly tables having 28–31 intervals. Monthly tables are stored locally on database 206 as long as space permits. The aging and summarizing process can be customized by users to comply with individual requirements.

Table 5 is a list of statistics that are stored to database 206 for each CDR profile.

TABLE 5

Number of Call Attempts
Number of Call Attempts Answered
Number of User Busy Calls
Number of Ring No Answer (RNA) Calls
Number of Normal Release Calls
Number of Abnormal Release Calls
Number of Unallocated Number Calls

TABLE 5-continued

Number of Address Incomplete Calls
Number of Transaction Aborts
Number of Congested Transactions
Number of Congested Calls
Number of Circuit Unavailable Calls
Number of Failed Transactions
Number of Failed Calls
Number of Undefined Release Cause Failed Calls
Number of Destination Out of Order Failed Calls
Average Call Set-Up Time
Average Call Hold Time
Average Answer Seizure Ratio
User Defined The user can define specific statistics, such as release causes, that are to be stored for a particular CDR profile.

Table 6 is a list of aggregations that can be used to group the above statistics for reports to be generated by QA report application 207.

TABLE 6

Calling Numbers
Called Numbers
Translated Numbers
Called Numbers, then by Calling Numbers
Translated Numbers, then by Calling Numbers
Called Numbers, then by Translated Numbers
Services
Services, then by Calling Numbers
Services, then by Called Numbers In Table 6 it will be understood that called, calling or translated numbers may be either a complete telephone number or a partial telephone number. For example, under the North American Numbering Plan, reports may be created for fall telephone numbers (i.e. 1-NPA-NXX-XXXX). Alternatively, wildcards can be used at the end of the grouping telephone number so that statistics are reported for all calls or transactions directed to a particular area code (i.e. 1-NPA) or a particular exchange code (i.e. 1-NPA-NXX).

Users can also configure QA report application 207, via QA report GUI 208, to create their own query parameters. Queries can be stored in database 206 and stored queries can be modified. Reports from QA report application 207 may be displayed to the user on QA workstation 132. Alternatively, reports may be printed, directed to an electronic mail address, stored to a database file, or exported to an ASCII file. Users can configure weekly, monthly, or other periodic reports which are sent at intervals to specific users. Such periodic reports may be assigned to QA report application 207 to be run automatically.

Dynamic behavioral statistics may also be generated by QA report application 207. Users can select to have the statistics of Table 1 reported as to the highest and/or lowest values. For example, a report may comprise the 16 highest called numbers, or the 16 services that are used the least. Behavioral statistics are retrieved using a Structured Query Language (SQL) query. Triggers can be configure to update a user's display according to changes in database 206. Once a group or aggregation of statistics is displayed, users can refine the report to obtain more specific data, such as a specific area code and exchange.

Users may track statistical events by designating a statistics to be displayed based upon a first occurrence, a occurrence that is more than some delta away from a certain value, or rising/falling thresholds. When triggered, events may be displayed to the user, or stored to a log file.

Users may also designate specific link sets or network nodes to be used for the statistical reports. Only those monitors that are coupled to the relevant links and nodes will receive the CDR profile data and only those monitors will send CDRs to QA server 129 for that profile.

Real-time statistics are also available from QA report application 207. Statistics are then updated after call or transaction completion and CDR generation. Displayed reports may be in the form of peg counts, bar graphs, or trend curves. Users may also configure reports based upon a sample of the calls or transactions or based upon a sample of the CDRs. The sampling rate may be selected using CDR generation GUI 204 on the user workstation.

It will be understood that workstation 126 and 132 may be separate components as described herein, or one workstation may be used to run both CDR configuration GUI 204 and QA report GUI 208.

It will also be understood that the QA server can accept CDR data from any source, not only from the monitoring system. For example, a switch or end office may generate CDRs and provide the data directly to the QA server for further processing. The QA server has a modularized front end which allows it to receive data from any source.

Although the invention has been described with respect to an SS7 system, it will be understood that the present invention may be adapted to monitor the quality of service provided on any communications network.

The present invention and its advantages have been described in detail herein, however, it should be understood that various changes, substitutions and alterations can be made herein without departing from the spirit and scope of the invention as defined by the appended claims.

What is claimed is:

1. A monitoring system for a communications network comprising:

means for capturing messages from links in said communications network;

means for sending, to a transaction tracking processor in a monitor, said captured messages;

means for correlating said captured messages into message records;

means for sending, to a CDR application in said monitor, said correlated captured messages;

if said captured messages are received out of sequence by said transaction tracking processor, means for sending said out of sequence messages to said CDR application;

means for generating, by said CDR application, call detail records from said message records;

means for attaching, by said CDR application, said out of sequence messages to said call detail records;

means for providing, by a CDR configuration application, a call detail record profile to said CDR application, wherein said CDR application sends said call detail records to a quality assurance statistics application based on said call detail record profile;

interface means for allowing users to configure said call detail record profiles;

means for gathering, by said quality assurance statistics application, statistics from said call detail records;

means for storing, by said quality assurance statistics application, said statistics to a database;

means for recalling, by a quality assurance report application, said statistics from said database;

means for formatting, by said quality assurance report application, said statistics;

interface means for configuring a report profile, wherein said report profile comprises said formatted statistics to be recalled from said database; and means for displaying said statistics to said user.

2. The system of claim 1 further comprising:

profile storage means for storing said call detail record profiles.

3. The monitoring system of claim 1 wherein said call detail record profile comprises parameters selected from the group consisting of:

Call State that Triggers the CDR Generation;

Address Complete;

Answer;

Call Termination;

Application Type;

Point Codes;

Calling Party Numbers;

Called Party Numbers;

Translated Numbers;

Mobile Identification Number (MIN);

Routing Numbers;

Account Numbers;

Electronic Serial Number; and

Location Routing Number.

4. The monitoring system of claim 1 wherein said call detail records comprise parameters selected from the group consisting of:

Length of Entire CDR;

Length of Fixed Fields;

CDR Sequence Number;

CDR Condition Indicator;

Time of Transaction Start;

Time of Transaction End;

Carrier Identification Codes;

Origination Point Code;

Destination Point Code;

Abort Reason;

Application;

Number of Calling Party Digits;

Calling Party Number;

Number of Called Party Digits; and

Called Party Number.

5. The system of claim 1 wherein said statistics are selected from the group consisting of:

Number of Call Attempts;

Number of Call Attempts Answered;

Number of User Busy Calls;

Number of Ring No Answer (RNA) Calls;

Number of Normal Release Calls;

Number of Abnormal Release Calls;

Number of Unallocated Number Calls;

Number of Address Incomplete Calls;

Number of Transaction Aborts;

Number of Congested Transactions;

Number of Congested Calls;

Number of Circuit Unavailable Calls;

Number of Failed Transactions;

Number of Failed Calls;

Number of Undefined Release Cause Failed Calls;
Number of Destination Out of Order Failed Calls;
Average Call Set-Up Time;
Average Call Hold Time; and
Average Answer Seizure Ratio.

6. A monitoring method for a communications network comprising the steps of:

capturing messages from links in said communications network;

sending said captured messages to a transaction tracking processor in a monitor;

correlating said captured messages into message records;

sending said correlated captured messages to a CDR application in said monitor;

if said captured messages are received out of sequence by said transaction tracking processor, sending said out of sequence messages to said CDR application;

generating, by said CDR application, call detail records from said message records;

attaching, by said CDR application, said out of sequence messages to said call detail records;

providing, by a CDR configuration application, a call detail record profile to said CDR application, wherein said CDR application sends said call detail records to a quality assurance statistics application based on said call detail record profile;

receiving user input to configure said call detail record profiles from a user interface;

gathering, by said quality assurance statistics application, statistics from said call detail records;

storing, by said quality assurance statistics application, said statistics to a database;

recalling, by a quality assurance report application, said statistics from said database;

formatting, by said quality assurance report application, said statistics;

receiving user input for configuring a report profile from a user interface, wherein said report profile comprises said formatted statistics to be recalled from said database; and displaying said statistics to said user.

7. The method of claim 6 further comprising:

storing said call detail record profiles in a profile storage element.

8. The method of claim 6 wherein said call detail record profile comprises parameters selected from the group consisting of:

Call State that Triggers the CDR Generation;
Address Complete;
Answer;
Call Termination;
Application Type;
Point Codes;
Calling Party Numbers;
Called Party Numbers;
Translated Numbers;
Mobile Identification Number (MIN);
Routing Numbers;
Account Numbers;
Electronic Serial Number; and
Location Routing Number.

9. The method of claim 6 wherein said call detail records comprise parameters selected from the group consisting of:

Length of Entire CDR;
Length of Fixed Fields;
CDR Sequence Number;
CDR Condition Indicator;
Time of Transaction Start;
Time of Transaction End;
Carrier Identification Codes;
Origination Point Code;
Destination Point Code;
Abort Reason;
Application;
Number of Calling Party Digits;
Calling Party Number;
Number of Called Party Digits; and
Called Party Number.

10. The method of claim 6 wherein said statistics are selected from the group consisting of:

Number of Call Attempts;
Number of Call Attempts Answered;
Number of User Busy Calls;
Number of Ring No Answer (RNA) Calls;
Number of Normal Release Calls;
Number of Abnormal Release Calls;
Number of Unallocated Number Calls;
Number of Address Incomplete Calls;
Number of Transaction Aborts;
Number of Congested Transactions;
Number of Congested Calls;
Number of Circuit Unavailable Calls;
Number of Failed Transactions;
Number of Failed Calls;
Number of Undefined Release Cause Failed Calls;
Number of Destination Out of Order Failed Calls;
Average Call Set-Up Time;
Average Call Hold Time; and
Average Answer Seizure Ratio.

* * * * *